United States Patent Office 3,383,937
Patented May 21, 1968

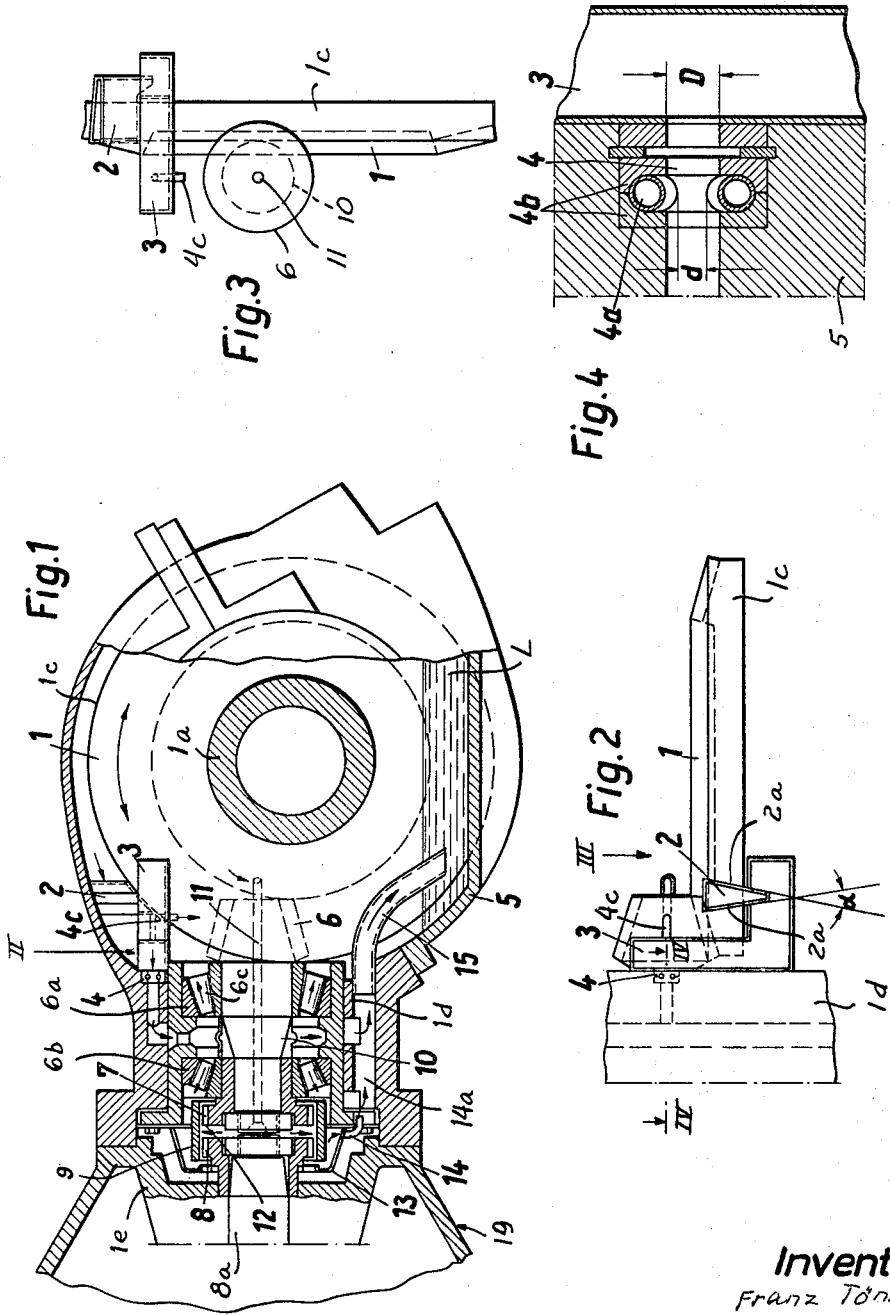

3,383,937
LUBRICATING MEANS FOR TRANSMISSION AND BEARING MEANS
Franz Toenne, Dusseldorf, and Werner Brand, Bergisch-Neukirchen, Germany, assignors to Waggonfabrik Urdingen A.G., Werk Dusseldorf, Dusseldorf, Germany
Filed Feb. 25, 1966, Ser. No. 530,225
Claims priority, application Germany, Apr. 17, 1965, W 38,996; Nov. 8, 1965, W 40,255
11 Claims. (Cl. 74—467)

ABSTRACT OF THE DISCLOSURE

A lubricating system for a driving arrangement of the type wherein a prime mover transmits rotary motion to an axle through the intermediary of a clutch connected to the prime mover, a first gear coupled to the clutch and meshing with a second gear connected to the axle, and wherein the lubricating system includes a housing surrounding the second gear and containing a supply of lubricant, a lubricant-admitting channel provided in the first gear and connecting the interior of the mentioned housing with the interior of another housing surrounding the clutch, means for sealing the clutch housing towards the prime mover, and a return conduit for conveying lubricant from the clutch housing into the first-mentioned housing.

---

The present invention relates to driving arrangements in general, and more particularly to improvements in driving arrangements of the type wherein a prime mover transmits rotary motion to an axle or to an analogous rotary driven member through the intermediary of a set of intermeshing gears. Still more particularly, the invention relates to novel lubricating systems which may be utilized in a driving arrangement of the just outlined type.

In axle drives of locomotives and other types of railroad vehicles wherein the prime mover comprises an electric motor or the like, continuous lubrication of rotary parts presents serious problems. Such problems are particularly serious when certain component parts of the motion transmitting unit between the axle and the prime mover are not accommodated in the gear box proper, and when the vehicle is not provided with a separate lubricant-containing receptacle for such component parts. Lubrication by means of grease does not represent a satisfactory solution because such lubricant is hurled by centrifugal force so that the grease job must be repeated at frequent intervals. Similar problems arise in lubrication of gear clutches which couple rotary output shafts with driven shafts or with other motion receiving elements. In such clutches, the intermeshing parts must have some freedom of axial and/or radial movement with reference to each other in order to compensate for unavoidable inaccuracies in manufacture. When in actual operation, the parts rub against each other and remove the film of lubricant.

Accordingly, it is an important object of the present invention to provide a novel automatic lubricating system for a driving arrangement of the type wherein a rotary driven member receives motion from a prime mover and wherein at least some component parts of the motion transmitting connection between the prime mover and the driven member cannot be lubricated from a separate source of lubricant.

Another object of the invention is to provide a lubricating system which is especially suited to furnish a continuous stream of lubricant to a clutch between a motor and a bevel gear drive for axles of railway vehicles and analogous conveyances.

A further object of the invention is to provide a lubricating system whose lubricating operation is fully automatic and is started in response to rotation of the component parts of the driving arrangement, and which can furnish lubricant to the respective parts along a plurality of separate paths.

An additional object of the invention is to provide a lubricating system which can automatically return unused or spent lubricant back to the source and which can control the lubricating operation in such a way that the rate of lubricant flow will depend on the temperature of lubricant.

Still another object of the invention is to provide a lubricating system which can be readily installed in presently known axle drives for railway vehicles without necessitating substantial alterations in the design of such drives.

Briefly stated, one feature of the present invention resides in the provision of a driving arrangement which comprises an electric motor or another suitable prime mover having a rotary output member, an axle or another rotary driven member, a transmission for rotating the driven member including a gear clutch or another suitable motion transmitting unit connected with the output member, a first gear coupled with the motion transmitting unit, and a second gear meshing with the first gear and arranged to rotate the driven member, a first housing for the motion transmitting unit, and lubricating means for the transmission including a second housing containing a supply of lubricant and surrounding the second gear, lubricant-admitting channel means provided in the first gear and connecting the interior of the second housing with the interior of the first housing, baffle means for sealing the interior of the first housing to prevent flow of lubricant toward the prime mover, and return conduit means for conveying lubricant from the first housing back into the second housing.

In accordance with another important feature of the present invention, a revolving surface of the second gear or of another element which is rotatable therewith is arranged to dip into the supply of lubricant in the second housing so that such surface is coated with a film of lubricant. The driving arrangement then further comprises a blade or an analogous stripper which removes lubricant from such surface, a tank or an analogous receptacle for collecting the thus removed lubricant, and further conduit means for conveying lubricant from the tank into the first housing means.

The novel features which are considered as characteristic of the invention are set forth in particular in the appended claims. The improved driving arrangement itself, however, both as to its construction and the mode of lubricating the same, together with additional features and advantages thereof, will be best understood upon perusal of the following detailed description of a specific embodiment with reference to the accompanying drawings, in which:

FIG. 1 is a vertical section through the driving arrangement;

FIG. 2 is a top plan view of a portion of an auxiliary lubricating unit, substantially as seen in the direction of the arrow II in FIG. 1;

FIG. 3 is a side elevational view, substantially as seen in the direction of the arrow III in FIG. 2; and FIG. 4 is an enlarged fragmentary section, substantially as seen in the direction of arrows from the line IV—IV of FIG. 2, and illustrates the construction of a control element which regulates the flow of lubricant from the tank of the auxiliary lubricating unit.

Referring to the drawings in detail, there is shown a driving arrangement which is utilized to rotate the axle 1a of a railway vehicle or another conveyance. The axle 1a constitutes a rotary driven member and is coaxially secured to a driven bevel gear 1 accommodated in a housing or gear boxe 5 containing a supply of oil or another suitable lubricant L. The smooth annular peripheral surface 1c of the bevel gear 1 dips into the supply of lubricant so that it is constantly coated with a film of lubricant as soon as the axle 1a is set in rotary motion, i.e., as soon as the bevel gear 1 is driven by a mating bevel gear 6 whose shaft 10 is rotatable about a horizontal or nearly horizontal axis and is mounted in two sets of thrust bearings 6a, 6b. The bearings are accommodated in a second housing 1d which is shown as being telescoped into the housing 5 and which further accommodates a motion transmitting unit including a driven clutch element or pinion 7 secured to or integral with the shaft 10, a driving clutch element or pinion 8 which is integral with the rotary output shaft 8a of a reversible variable-speed electric motor, not shown, and an internal gear 9 which meshes with the pinions 7, 8 and causes the shaft 10 to rotate in response to rotation of the output shaft 8a. The output shaft 8a is surrounded by a housing 1e which forms part of the motor and is connected with the housing 5 so that the housing 1d is located between the housings 5 and 1e.

In accordance with a feature of the present invention, the driving arrangement is lubricated mainly by such lubricant which enters the intake end of a channel 11 constituted by an axial bore provided in the shaft 10 and discharging into an internal space 12 of the gear clutch 7–9. When the axle 1a is driven, lubricant is splashed into the bore 11 and the flow of such lubricant into the space 12 is enhanced by rotation of the shaft 10. The second housing 1d is connected with an annular baffle 13 which prevents lubricant from flowing toward the parts mounted in the housing 1e of the motor and which directs such lubricant into a return conduit including a pipe 14, a groove 14a machined into the housing 5 and/or 1d, and a pipe 15 which discharges lubricant into the housing 5 by gravity flow. The output shaft 8a is journalled in the motor housing 1e and extends into the chamber defined by the baffle 13.

The auxiliary lubricating system includes a lubricant remover or stripper 2 which is mounted in the housing 5 at a level above the supply of lubricant L and has two stripping faces 2a each of which is inclined with reference to the axis of the bevel gear 1 (see the angle alpha in FIG. 2). One of these stripping faces 2a removes the film of lubricant from the peripheral surface 1c and directs the thus removed lubricant into a tank 3 which is mounted in the housing 5. A conduit 4 conveys such lubricant through a control member 4a and into the space between the bearings 6a, 6b, i.e., into the second housing 1d. The space between the bearings 6a, 6b communicates with the annular spaces between the inner and outer races of such bearings so that the lubricant may reach the rolling elements 6c, and such space has an outlet which discharges into the groove 14a whereby surplus lubricant returns into the housing 5 via pipe 15.

The construction of the control member 4a is shown in FIG. 4. In the illustrated embodiment, the member 4a consists of an elastically deformable ring which is filled with a gaseous fluid. The ring is accommodated in a two-piece socket 4b and its central aperture forms part of the conduit 4. When the temperature of the lubricant increases, i.e., when the viscosity of lubricant decreases, the fluid in the ring 4a expands and reduces the diameter of the central aperture from D to d, so that a smaller quantity of lubricant can flow into the bearings 6a and 6b.

It is clear that the control member 4a may be replaced by a bimetallic element or another suitable element which can regulate the flow of lubricant as a function of temperature. Surplus lubricant which accumulates in the tank 3 can escape through an overflow pipe 4c which directs such lubricant onto the teeth of the bevel gear 1 and/or 6.

The parts 1 and 6–10 together constitute a transmission which serves to transmit motion from the output shaft 8a to the axle 1a, and the motion transmitting clutch 7–9 of this transmission receives lubricant mainly through the bore 11 of the shaft 10. The parts 2, 3, 4 4a, 4b and 4c constitute an auxiliary or secondary lubricating unit which supplies lubricant mainly to the teeth of the gears 1 and 6 and to the bearings 6a, 6b. The improved lubricating systems may be utilized in all such driving arrangements wherein certain motion transmitting parts cannot receive lubricant directly from a supply contained in a gear box or another type of housing surrounding some or all of the remaining motion transmitting parts. A driving arrangement of the type shown in FIGS. 1 to 4 may be installed with particular advantage in railway vehicles which are used for short-distance local transportation of passengers or goods.

Since the level of lubricant in the housing 5 must be supervised anyway, the component parts which are accommodated in the housing 1d invariably receive a requisite amount of lubricant despite the fact that the driving arrangement includes a single supply of lubricant, i.e., that the housing 1d is without an oil sump. The rate of lubrication is proportional to the r.p.m. of revolving parts and such parts are lubricated regardless of the direction in which the axle 1a rotates. Furthermore, the lubricaitng systems are effective in cold weather when the viscosity of lubricant is high, as well as in warm weather. When the parts of the driving arrangement rotate, lubricant which leaves the chamber 12 is subjected to the action of centrifugal force and enters the interior of the baffle 13, i.e. such lubricant automatically flows toward the intake end of the conduit 14. The baffle 13 may form a fluidtight seal around the output shaft 8a or around the hub of the pinion 8 on the shaft 8a.

Without further analysis, the foregoing will so fully reveal the gist of the present invention that others can, by applying current knowledge, readily adapt it for various applications without omitting features which fairly constitute essential characteristics of the generic and specific aspects of the above outlined contribution to the art and, therefore, such adaptations should and are intended to be comprehended within the meaning and range of equivalence of the following claims.

What is claimed as new and desired to be protected by Letters Patent is:

1. A driving arrangement of the character described, comprising a prime mover having a rotary output member; a rotary driven member; a transmission for rotating the driven member including motion transmitting means connected with said output member, a first gear coupled with said motion transmitting means, and a second gear meshing with said first gear and arranged to rotate said driven member; a first housing for said motion transmitting means; and lubricating means for said transmission including a second housing containing a supply of lubricant and surrounding said second gear, lubricant-admitting channel means provided in said first gear and connecting the interior of said second housing with the interior of said first housing, said lubricant-admitting channel means having an inlet end in said second housing and an outlet end in said first housing so that lubricant will flow through said channel means from said second to said first housing, means for sealing said first housing against penetration of lubricant toward said prime mover, and stationary return conduit means for conveying lubricant from said first housing back into said second housing.

2. A driving arrangement as set forth in claim 1, wherein each of said gears constitutes a bevel gear and wherein said second gear is coaxially secured to said driven member, said first gear having a shaft which is coupled to said motion transmitting means and said channel means being constituted by an axial bore provided in said shaft.

3. A driving arrangement as set forth in claim 2, wherein said motion transmitting means comprises a clutch and wherein said output member is substantially coaxial with said first gear.

4. A driving arrangement as set forth in claim 1, further comprising second lubricating means including an annular surface rotatable with said second gear in said second housing and dipping into said supply of lubricant so that said surface is coated with a film of lubricant in response to rotation thereof, means for removing lubricant from said surface, a tank for collecting the thus removed lubricant, and further conduit means for conveying lubricant from said tank into said first housing.

5. A driving arrangement as set forth in claim 4, further comprising bearing means for said first gear provided in said first housing, said further conduit means being arranged to supply lubricant from said tank to said bearing means.

6. A driving arrangement as set forth in claim 4, further comprising control means for regulating the cross-sectional area of said further conduit means.

7. A driving arrangement as set forth in claim 6, wherein said control means is responsive to changes in viscosity of lubricant to reduce the cross-sectional area of said further conduit means when the viscosity of lubricant decreases.

8. A driving arrangement as set forth in claim 7, wherein said control means comprises a fluid-filled annular member of elastically deformable material having a central opening constituting a portion of said further conduit means.

9. A driving arrangement as set forth in claim 1, wherein said channel means is located in a substantially horizontal plane and wherein said return conduit means is arranged to convey lubricant by gravity flow.

10. A driving arrangement as set forth in claim 1, wherein said sealing means comprises annular baffle means defining with said motion transmitting means a chamber which communicates with said channel means and with said return conduit means.

11. A driving arrangement as set forth in claim 10, wherein said prime mover comprises a third housing which is connected with one of said first named housings, said output member being journalled in said third housing and extending into said chamber, said baffle means being arranged to prevent entry of lubricant from said chamber into said third housing.

References Cited
UNITED STATES PATENTS

| | | | |
|---|---|---|---|
| 1,143,307 | 6/1915 | Noyes | 184—11 |
| 1,775,623 | 9/1928 | Morgan. | |
| 2,015,108 | 9/1935 | Harper | 184—11 |
| 3,065,822 | 11/1962 | McAfee et al. | |
| 3,162,269 | 12/1964 | Reed | 74—467 X |
| 3,182,527 | 5/1965 | Bryan | 74—467 X |

DONLEY J. STOCKING, *Primary Examiner.*

L. H. GERIN, *Assistant Examiner.*